(12) United States Patent
Huffman

(10) Patent No.: US 6,427,612 B1
(45) Date of Patent: Aug. 6, 2002

(54) HITCH MANIFOLD SYSTEM

(75) Inventor: Thomas R. Huffman, Minnetrista, MN (US)

(73) Assignee: Hydro Engineering, Inc., Young America, MN (US)

(*) Notice: Subject to any disclaimer, the term of this patent is extended or adjusted under 35 U.S.C. 154(b) by 0 days.

(21) Appl. No.: 09/335,393

(22) Filed: Jun. 17, 1999

Related U.S. Application Data

(63) Continuation of application No. 60/089,672, filed on Jun. 17, 1998.

(51) Int. Cl.[7] .............................................. A01C 23/00
(52) U.S. Cl. ...................................... 111/118; 172/439
(58) Field of Search .................... 111/118, 119, 120, 111/123, 124, 125, 127, 129; 172/439, 450, 451, 445.1; 239/146, 147, 172

(56) References Cited

U.S. PATENT DOCUMENTS

| | | | |
|---|---|---|---|
| 3,793,967 A | * 2/1974 | Van Den Berg | 111/7 |
| 4,014,271 A | * 3/1977 | Rohlf et al. | 111/7 |
| 4,073,346 A | * 2/1978 | Groth et al. | 172/451 X |
| 4,074,639 A | * 2/1978 | Hodgson | 111/6 |
| 4,195,860 A | * 4/1980 | Helams | 172/451 X |
| 4,232,616 A | * 11/1980 | Van Der Lely | 111/7 |
| 4,280,564 A | * 7/1981 | Van Der Lely | 172/151 |
| 4,406,413 A | * 9/1983 | Houle | 241/46.04 |
| 5,271,567 A | * 12/1993 | Bauer | 239/662 |
| 5,707,170 A | * 1/1998 | Wattonville | 172/451 X |
| 5,743,341 A | * 4/1998 | Wattonville | 172/451 |

OTHER PUBLICATIONS

Hanna Et Al., Crop Residue and Manure Application, Iowa State University, pp. 1–3, Oct. 1999.*
John Dietz, No–Smell Hog Manure, New Holland News, pp. 1–4, Jan. 1998.*
Balzer Inc., Drag Hose System & Injectors for Liquid Manure, 5 pages, Dec. 1998.*
Farming and Preserving the Environment, Lands Sake, pp. 1–5, Dec. 1998.*
Rick Koelsch, Enviromental Considerations for Manure Application System Selection, pp. 1–8, Jun. 1996.*
M. Dougherty, et al., "Liquid Manure Application Systems Design Manual", Northeast Regional Agricultural Engineering Services Cooperative Extension publication No. NRAES–89, pp. 91–95 (1998).

* cited by examiner

*Primary Examiner*—Victor Batson
(74) *Attorney, Agent, or Firm*—Fredrikson & Byron, P.A.

(57) ABSTRACT

A liquid manure application system, including a drag hose assembly and three point hitch adapted to retain the assembly in the course of operation while permitting the releasable three point attachment of tillage tools. The hitch itself provides dimensions and characteristics adapted for such use, including a structural attachment site for the drag hose assembly and a side load capacity considerably greater that comparative available hitches, and sufficient to withstand the side load forces encountered in the course of manure application.

45 Claims, 3 Drawing Sheets

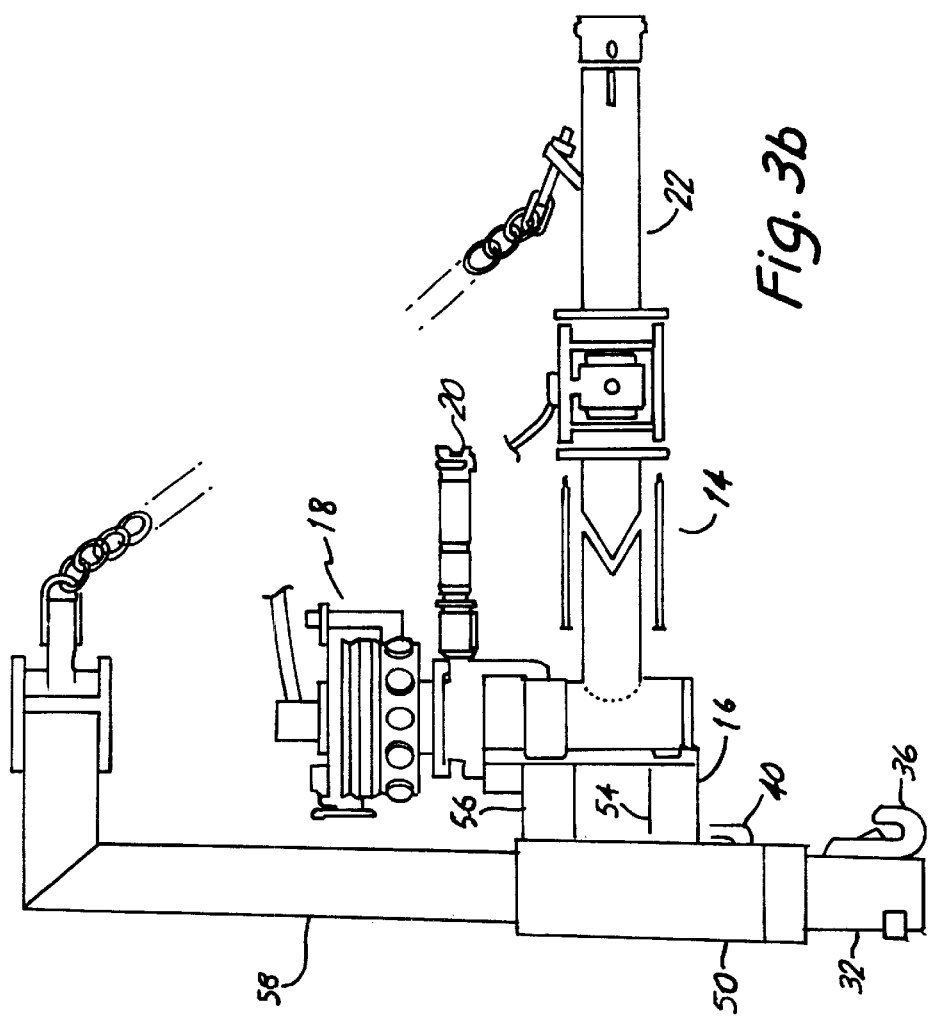
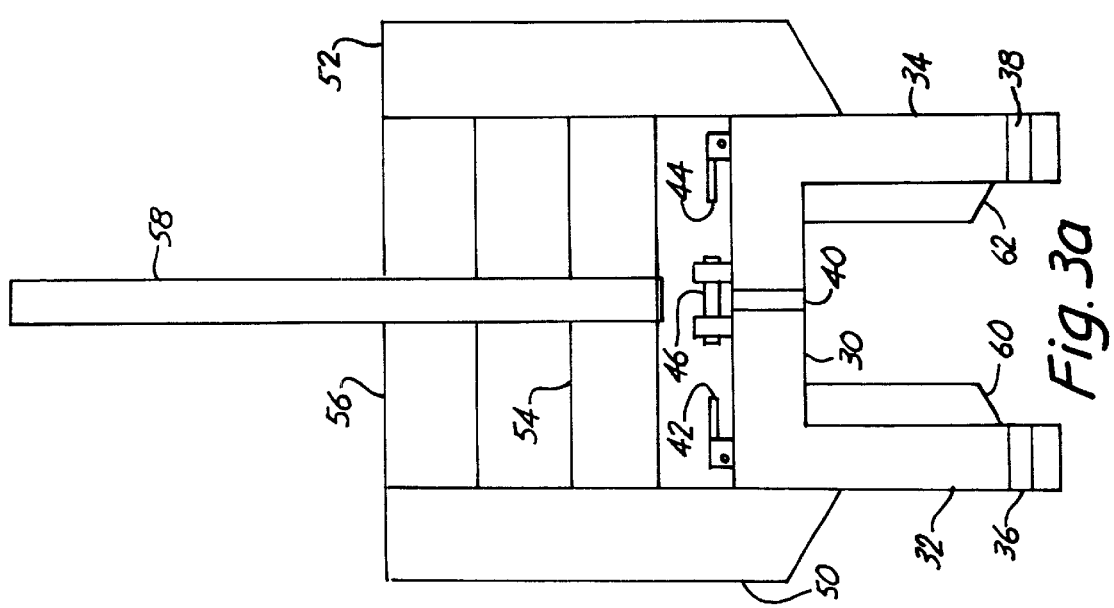

HITCH MANIFOLD SYSTEM

CROSS REFERENCE TO RELATED APPLICATIONS

The present application is a continuation of U.S. patent application filed Jun. 17, 1998 and assigned Ser. No. 60/089,672, the entire disclosure of which is incorporated herein by reference.

TECHNICAL FIELD

In one aspect, the present invention relates to farm equipment, and in particular, to manifold systems for delivering liquid manure or sludge for agricultural use. In another aspect, the invention relates to hitches, such as three point hitches, for use in attaching implements to tractors.

BACKGROUND OF THE INVENTION

The use of manure and sludge in farming has taken on increased attention over recent years. There are number of benefits associated with such materials, including the cost of obtaining and handling these materials, and their value as a source of nutrients. Continuous and careful use of manure can improve the physical and chemical properties of nearly all soils, particularly those that are shallow, coarse textured, or low in organic matter. Manure provides essential elements for crop growth and, in adding organic matter, serves to improve soil structure and increase the soil's ability to hold water and nutrients and to resist compaction and crusting.

Drag hose systems, also called towed-hose injection systems, have been used commercially to inject municipal sludge since the 1960s. Agricultural applications were developed at the University of Minnesota in the early. 1 970s. Drag hoses offer important advantages for farms that require large-volume manure applications, in that they allow liquid manure to be surface applied, or incorporated in remote locations using an irrigation pump, drag hose (soft hose), tillage implement, and tractor. The pump itself provides manure to the tractor through a soft, flexible hose. Using a drag hose system, most of the tool bar applications commonly used with tankers can be used for surface application. For incorporation, the tractor pulls the drag hose and a tillage implement. See, for instance, M. Dougherty, et al., "Liquid Manure Application Systems Design Manual", Northeast Regional Agricultural Engineering Services Cooperative Extension publication No. NRAES-89, pp. 91–95 (1998), the disclosure of which is incorporated herein by reference, in which FIG. 4. 16 presents the basic components of a drag hose system.

Dougherty, et al. go on to explain that the cost of applying liquid manure with a drag hose is dependent upon the total amount of liquids manure to be applied and the distance from the storage to the field. Requirements for a basic drag hose system typically include:

satellite storage or other manure supply irrigation pump and engine piping or tanker transport to the field at least one 660-foot drag hose manifold to be mounted on the tillage implement.

One disadvantage of the drag hose system, according to Dougherty et al., is the difficulty in obtaining equipment, since this method of liquid manure application is not common in all parts of the country. Presently, there are only a small number of suppliers for drag hose systems. Specialized equipment and experience is required to assemble and operate a drag hose system properly. The equipment has a high capital cost in comparison to the more traditional liquid tanker or spreader. If tillage is not needed, drag hose systems can be more expensive than big gun irrigation. Other potential disadvantages of drag hose systems include the following:

Distance to the field may be a limitation.

Obtaining right-of-way for pipeline access.

Liquid manure must be dilute enough to be pumpable (<8% TS).

Drag hose systems using tillage may cause excessive erosion on sloping ground.

Deep injection does not work well in shallow, stony, or frozen soils.

Extra pumps and tractors may be required.

High application rates may result in overapplication of nutrients such as Nitrogen and Phosphorus.

Conventional drag hose systems typically involve the use of a drag hose assembly, permanently attached to a corresponding tillage tool. Although the tillage tool, in turn, can be quickly coupled to a standard three point hitch, the drag hose assembly itself remains dedicated (generally welded at its swivel) to that particular tool. While such systems have found widespread use they continue to suffer from other common drawbacks as well, including (1) the cost of having a special tool bar for dedicated use in the injection operation, (2) the added labor required to change the tillage tool in accordance with soil conditions, crop requirements, application requirements (e.g., high or low gallons per acre), and the volume delivered to the manifold. The costs associated with transportation and storage, environmental concerns, and handling (i.e., labor) and equipment. Moreover, such systems are typically time consuming to use, requiring the operator to take several steps to attach and detach the equipment.

On a separate subject, farming equipment has evolved tremendously over the past century. Built around the tractor itself, a variety of equipment has been developed in a manner that continually strives to match the equipment to the tractor, both in mechanical terms as well as in terms of economic conditions, weather and terrain, and labor savings. In order to lessen the cost of equipment investment, a variety of hitches have been developed, including drawbar hitches, drawbar hitches adapted for use as a three point hitch (by the use of stay bars) and three point hitches themselves.

Integral hitches (single point, two point or three point) are typically rear mounted and hydraulically controlled. Three point hitches are the most commonly used, and have been used to attach a variety of equipment, including tillage equipment (plows, discs, field cultivators), planting equipment (drills, planters, cultivators), and harvesting equipment (e.g., hay and forage equipment, mowers, balers, harvesters, combines and pickers). Most of such equipment, and particularly rear mounted equipment, is designed to be pulled directly behind the tractor, and so exhibits relatively little stress in the lateral direction. The hitches themselves are categorized largely by their maximum drawbar power, with the highest levels being Category III intended for 80–225 hp and Category IV for. 180–400 hp. See, for instance, Jeffers product description sheet. To Applicant's knowledge, however, none of the commercially available three point hitches have been described or are suitable for use in connection with drag hose operations as described above.

BRIEF DESCRIPTION OF THE DRAWING

In the Drawing:

FIGS. 3a and 3b show schematic views of the hitch and drag hose system of the present system.

In the Figures like characters of reference indicate corresponding parts of different Figures.

SUMMARY OF THE INVENTION

Figure 1:
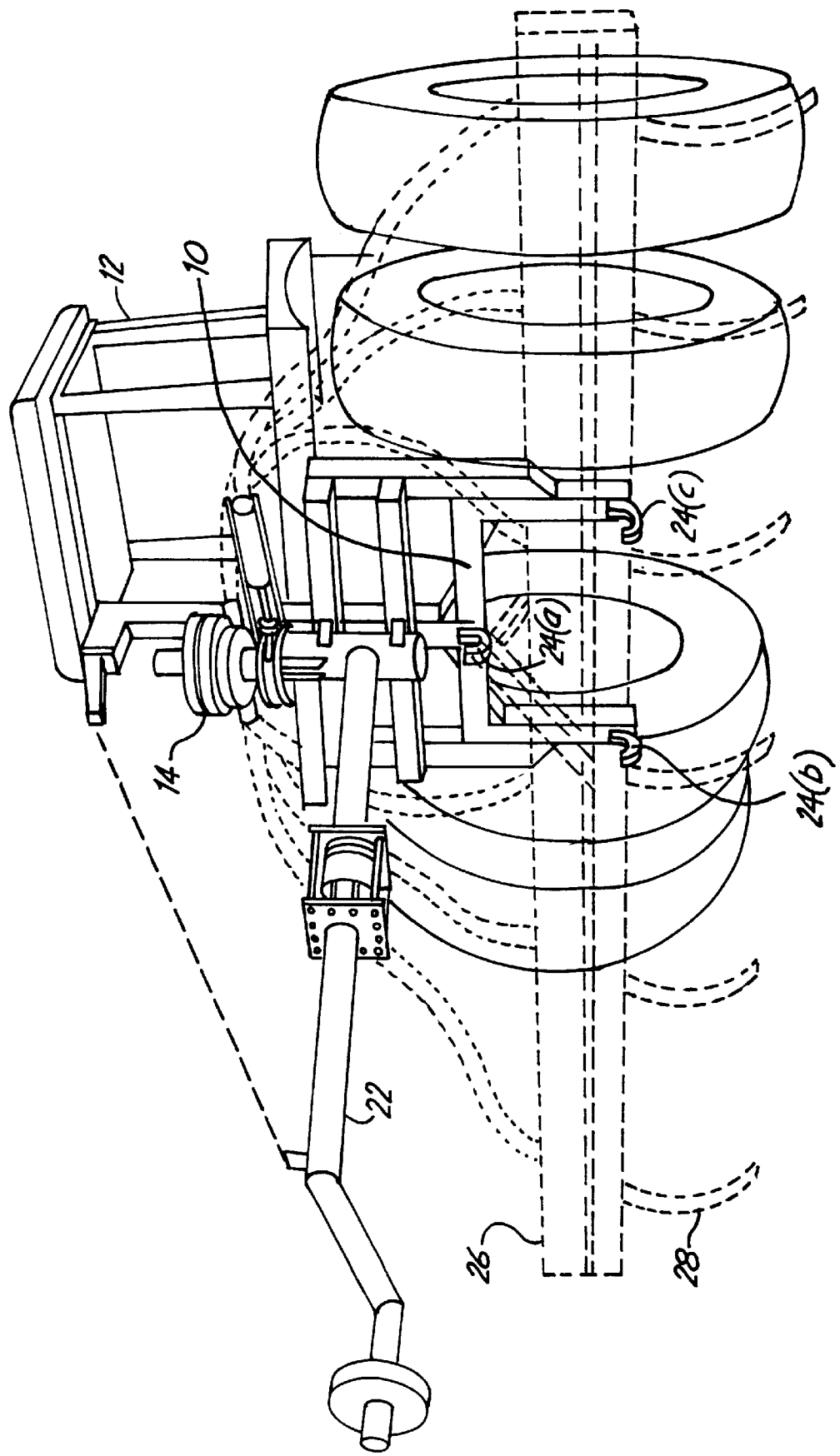
FIG. 1 shows a perspective view of a system of the present invention, including a conventional Category III hitch that has been modified in accordance with the present invention.

The present invention provides a liquid manure application system, including a drag hose assembly and a three point hitch adapted to retain the drag hose assembly on a tractor in the course of operation. Typically, the drag hose assembly is permanently attached (e.g., welded) to a three point hitch of this invention, in a manner that permits the interchangeable, quick (three point) attachment of different tillage tools to the hitch portion of the combined unit. The hitch, in turn, can itself be attached to a tractor in a conventional manner. The hitch (also referred to as a "quick attaching coupler") provides dimensions and characteristics adapted for such use, including an attachment structure for supporting and permanently attaching the drag hose assembly, with the hitch itself having a side load capacity considerably greater that commercially available hitches. In turn, the hitch is particularly well-suited to withstand the demanding side load forces encountered in the course of manure application. Optionally, the system can include other components of a liquid manure application system, including tillage equipment, tool bars, injection hoses, drag hoses, and the like.

In one embodiment, the present invention provides a three point hitch adapted to retain a drag hose assembly. As used herein, the term "drag hose assembly" will generally refer to one or more components of a drag hose system (e.g., swivel, manifold, agitator, swing tube, shut off valve, and optionally, the drag hose itself). Such an assembly is typically attached (e.g., welded) to the hitch at its swivel, as described in greater detail herein. In another embodiment, the invention provides a hitch manifold system comprising the three point hitch attached to a drag hose assembly. In yet another embodiment, the invention provides a hitch manifold system attached to a tractor, and in a further embodiment, the invention provides a tillage tool attached to the hitch manifold system positioned upon a tractor.

A hitch of the present invention can be fabricated in any suitable manner, e.g., by retrofitting a conventional hitch in order to both provide a support structure for the drag hose assembly component, and to improve its strength, and particularly its side pull strength. It is particularly important that the hitch be able to withstand the side load of the hose while turning around at the end of the field. As used herein, the term "side pull strength" will refer to a hitch that is able to withstand the lateral pull typically encountered in the course of commercial drag hose operations, in a manner that substantially maintains the structural integrity of the hitch.

In yet another aspect, the invention provides a method of attaching a drag hose assembly to a tractor, as well as a method of delivering manure to a field, the latter method involving the attachment and use of a system as described herein. The system, and particularly hitch, as described herein provide an optimal combination of features, including strength, versatility, ease of use and cost.

DETAILED DESCRIPTION OF THE INVENTION

A system of the present invention (e.g., including a three point hitch and drag hose assembly) provides improved performance in the course of liquid manure application as compared to conventional systems. The system allows an operator to drag a hose of various sizes (e.g., 4", 4½", 5" or 6" diameter), and lengths of up to 1,320 feet, which can create a load of up to 12,000 pounds. The additional lateral load contributed by the use of a tillage tool attached to the hitch can vary to the point where a conventional 250 hp tractor is capable of pulling both the hose and the tillage implement.

Hitches useful in a system of this invention can be provided in any suitable manner, e.g., by fabricating a hitch designed specifically for this purpose, or by retrofitting (e.g., adapting and strengthening) a commercially available hitch. Examples of commercially available hitches that can be retrofitted include, but are not limited to, standard hitches and adjustable hitches. Preferred hitches, for instance, are available from Jeffers, Inc., and particularly as model Jeffers J550, which is described as a "category III narrow hitch". Other suitable hitches can be of any suitable style and have any desired dimensions, e.g., having a lower socket inside span of between about 20 and about 50 inches, and preferably between about 30 and about 35 inches. Applicant has found that such hitches can be modified, e.g., by welding braces and brackets, in such a manner as to permit them to be used in a system of the present invention. In particular, the hitch can be modified by welding an attachment structure onto the hitch for use in supporting and permanently attaching the drag hose assembly. The original portion of the hitch is further modified by strengthening various components (particularly the vertical side beams and the central pin region) to permit greater side pull strength.

Optionally, and preferably however, a hitch of the present invention is specifically designed and fabricated for the purpose described herein, that is, to be permanently attached to a drag hose assembly, and adapted for interchangeable, releasable three point attachment to various tillage tools.

A system of the present invention will typically be available in the form of a three point hitch, as described herein, in combination with a drag hose assembly, and optionally with a tractor and/or one or more tillage tools. The various components can be sold separately or in varying combinations, with indications and directions for their attachment and use.

In order to improve interchangeability and ease of use, the hitch is preferably provided having conventional dimensions. With regard to the lower sockets, for instance, the hitch provides an inside span, socket width, socket offset, diameter and overhand in accordance with conventional parameters for Categories I, II, III or IV (standard or narrow). A preferred hitch is provided in the form of a fabricated or modified Category III narrow hitch. Similarly, the hitch provides corresponding and suitable parameters with regard to the upper hook width, overhang, opening, offset, depth and height dimension. A hitch of the present invention provides conventional lift range, power range, mast adjustment, leveling adjustment, tractor lift force capacity, while the hitch provides side sway provisions (and in turn, lateral force stability) that. meet or exceed conventional limits (as determined in accordance with ANSI/ASAE Standard S217, "Three Point Free-Link Attachment for Hitching Implements to Agricultural Wheel Tractors", the disclosure of which is hereby incorporated by reference).

The system can also include adapters and bushings for use in standardizing equipment. The hitch is preferably made of high strength steel, and provided with means (such as spring-loaded locking levers) in order to permit the hitch and tillage tools to mounted and unmounted easily.

The dimensions are adapted for use with corresponding implement and manifold units, e.g., in terms of the lower hitch pin (or adapter) outside diameter, lower hitch pin inner and outer shoulder spread and diameter, the coupler mast pin diameter and horizontal/vertical spacing, lower socket clearance and upper hook clearance, and the lower hitch pin adapter alignment.

FIG. 1 shows a perspective view of a system of the present invention, in the form of a conventional three point hitch that has been modified in accordance with the present invention. The hitch (10) is shown attached to a tractor (12) in a conventional fashion, by means of top and lower link pins (not shown). A drag hose assembly (14) is attached at its swivel portion (16) to hitch (10), and includes a manifold unit (18), shut off valve (20) and swing arm assembly (22). Hitch (10) provides three accessible hooks, including upper/central hook (24a), with corresponding side beam hooks (24b) and (24c), for use in attaching the tillage tool implement. Schematically indicated are anlattached tool bar (26) and cultivator tillage equipment (28).

Figure 2:
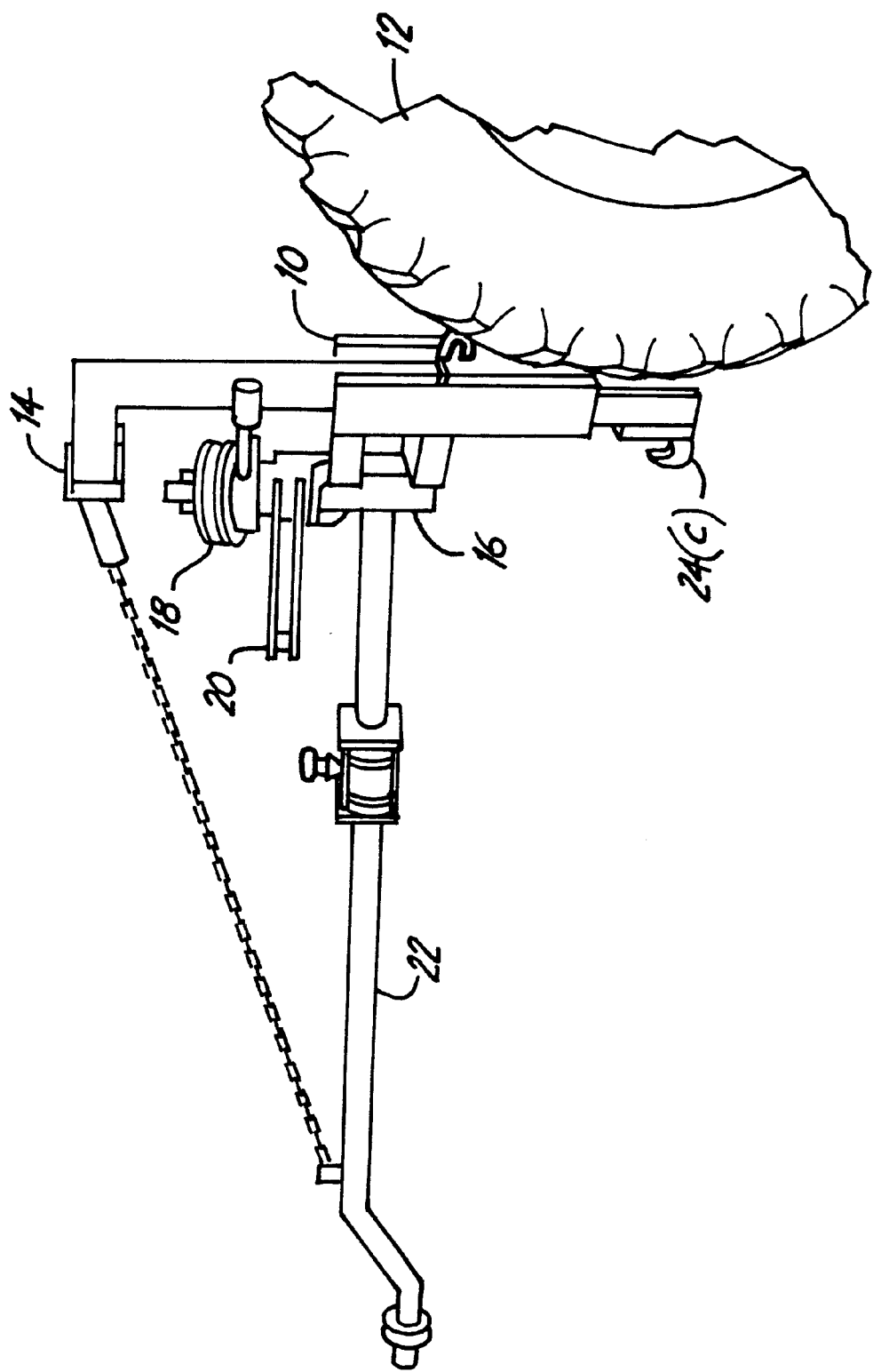
FIG. 2 shows a side elevational view of a system according to FIG. 1.

FIG. 2 shows a side view of the system of FIG. 2, including the hitch itself (10), tractor (12), and drag hose assembly (14), manifold (18), shut off valve (20), and swing arm (22).

FIG. 3 shows a conventional hitch (Jeffers Model J-550, Category III-N) which has been modified to provide a hitch of the present invention. As shown in FIG. 3(a), the conventional hitch is provided in the form of a frame having a horizontal center beam (30) integrally attached (e.g., welded) to a pair of vertical side beams (32) and (34), respectively. Each vertical side beam is provided with a hook assembly (36) and (38), respectively, and the center beam is provided with a Central hook (40), which together form the attachment points for a three point tillage tool. Each side hook, in turn, is provided with a corresponding top mounted spring-loaded locking lever (42) and (44), respectively, each arranged on a respective side of the center arm. On its opposite major surface (not shown), the hitch is provided with three link pins, including a top link pin (46) and two lower link pins (not shown), one positioned in each of the vertical side beams, for use in releasably attaching the hitch to a tractor.

The hitch has been modified so as to both provide an attachment structure for supporting and permanently attaching the drag hose assembly, and to improve its side load strength. The attachment structure (48) is shown welded to the original hitch, and includes a pair of vertical structural support members (50) and (52), respectively, that are themselves attached to both the original hitch vertical members and to a pair of horizontal structural support members (54) and (56). Also shown, as welded to both horizontal structural support members, is an optional central vertical support member (58) for use in supporting swing tubes (e.g., those longer than about 8 feet).

The original hitch has also been modified to improve its side load strength, including by the welded attachment of corresponding reinforcement beams (60) and (62), positioned on the interior faces of vertical beam members (32) and (34), respectively. The central link pin has also been reinforced (in a manner not shown) by increasing the thickness of the central pin hole.

As shown in FIG. 3(b), the hitch can be used to couple the draft links of a tractor with an implement having spaced draft pins adapted to be connected to the hitch. The frame of the hitch includes, in combination, a pair of lower spaced hook members (36) and (38) adapted to receive correspondingly spaced draft pins on the implement, and a pair of latch means (42) and (44) pivoted on the frame and movable between a first locking position, where a draft pin contained in each hook member is prevented by the lower edge of said latch means from leaving the hook, and a second release position wherein the pin may be released from the hook.

The hitch has been reinforced by welded steel in order to accommodate the additional forces created when turning in the field and/or when lifting components of the drag hose assembly and tillage tool to the raised position. Significant forces are created, for instance, as the swing tube of the manure application unit is elevated (e.g., to as high as 6 to 8 feet off the ground), particularly when attached at its end to a hose (e.g., 4 to 5 inch) filled with liquid. The additional lever action of the swing tube, combined with the weight of the liquid-filled hose, creates forces greater than a standard hitch can accommodate. Preferably, therefore, the upper hook is either designed or reinforced, in a hitch of the present invention, to accommodate the manifold attachment and such additional forces.

The frame of a hitch of the present invention is fabricated, or modified, so as to provide improved side load capacity as compared to conventional, unmodified hitches. Such improvement is evident in the course of use, e.g., with drag hose assembly attached. Such assemblies include the use of al swing tube that can turn up 90 degrees or more to the side in the course of turns, thereby creating side loads far greater than those encountered with conventional hitches and hitch implements. The maximum load is created when the end of the swing tube is positioned between about 6 to 8 feet off the ground, since swing tube itself can be as long as 25 to 40 feet, with a liquid filled hose hanging from its far end. For instance, a 50 foot length of 5 inch hose, filled with manure, can weigh well in excess of 400 pounds. As the operator of the tractor turns the equipment around at the end of the field, the pull force of such a hose can reach up to 3000 pounds. The combination of the lever action of the swing tube, the hose weight, and hose pull requires the hitch to be reinforced to at least about 3 to 5 times (depending on the original hitch style and manufacturer).

Pull loads can be tested in any suitable manner, e.g., by attaching two 3 inch hydraulic cylinders (at their respective ends) at or near the end of a swing tube, with the opposite ends of each cylinder being attached (via suitable couplers) to hoses for manure distribution. The cylinders can be filled with oil and fitted with pressure gauges record the oil pressure in the course of field operations. These pressures, in turn, can be used to calculate the forces involved in turning operations encountered in the field. When measured in this fashion, a hitch of the present invention is capable of withstanding on the order of 1000 pounds or more, and preferably on the order of 2000 pounds or more, and most preferably on the order of 3000 pounds or more of side pull force without undue deformation or failure.

Drag hoses suitable for use in a system of the present invention are described in Dougherty et al., cited above, land are typically manufactured by the same companies that supply fire hose and irrigation hose. The hose used for field applications is made heavier to withstand abuse and is constructed of an ultraviolet-resistant polyurethane cover and synthetic fiber inner lining. The woven synthetic fiber provides the tensile strength necessary to drag the hose. The outside of the hose resists abrasion, but sharp stones in the field will accelerate wear. The service life of a properly used drag hose is approximately 20 to 50 million gallons. The inside of the drag hose has a smooth coating to reduce friction loss.

A drag hose assembly can be mounted to many types of tillage implement. Drag hoses are coupled to a solid swing pipe that moves back and forth behind the tillage implement to protect the soft hose from damage. The swing pipe hooks to a riser or manifold hydraulic agitator distributor that distributes the manure to a number of hoses for injection or incorporation. The flexible hoses do not plug easily, especially when a chopper pump or separator is used ahead of the pump. Keeping the same diameter throughout the distribution tubes also helps prevent plugging.

An example of a preferred implement for injection with a drag hose is a 12-inch sweep point on a chisel plow set for a 4-inch depth. The sweep places the manure in a wide horizontal area at a shallow depth for quicker biological breakdown and subsequent plant uptake of nutrients. The use of a heavy offset disk where the manure is splashed between two gangs of disks has been successful. The first gang of disks opens up the ground and the second gang incorporates the applied manure. The tractor selected for each application must be able to pull the tillage equipment and drag hose full of manure. Depending on soil conditions, a 120- to 200-horsepower four-wheel-drive tractor is recommended.

Optional components of a drag hose system as described herein include the following:

hydraulic shutoff valve on the tool bar (to shut off flow while raising the tool bar)

pressure relief valve at the storage facility (to relieve excess line pressure from the pump)

magnetic inductive or Doppler flowmeter with remote digital readout and totalizer pressure gauge (with insulator) at the tool bar air pump to purge the lines and clean the hose assorted hose reels (for soft hose storage and transport)

auxiliary lengths of drag hose with tractor or hardhose reel (to provide a surface feeder line).

Other optional features of the drag hose/soft-hose ground application system include long (e.g., 23- to 30-foot) tool bars to achieve lower, more precise (4,000 gallon per acre) application rates, as well as large hose reels (e.g., holding up to 10 lengths of 660-foot soft hose), boom-mounted hydraulic (e.g., 30 hp) pumps for direct pumping from deep storage (>8 feet), electronic ground speed indicators for tractors, cab-mounted digital flowmeters with totalizers, and integrated radio control of pump from the tractor (throttle and shutoff) for one-man operation. Operation of the drag hose,/ soft hose system does not require the same high pressures as big gun travelers and pivot irrigation systems. Ten to twenty pounds per square inch at the manifold or swing pipe is sufficient. At these low outlet pressures, higher flow rates (gallons per minute) are available from the same size irrigation pump.

Flow rates at the manifold vary depending on the pump and pipe system, flowability of the liquid manure, and the elevation difference between the surface level and the field discharge. Typical flow rates vary from 400 gallons per minute to 1,000 gallons per minute. During land application, the tillage implement should be raised occasionally to assure that none of the liquid manure distribution lines are plugged. Depending on the method used, up to 40 acres can be incorporated or injected with liquid manure before changing setup to a new site (see following section on driving patterns). Reels that are used to wind up the drag hose help decrease setup time.

With a soft-hose system, the operator of the tractor determines how much liquid is applied and where it is applied. Application rates are varied by changing the speed of the tractor. The above described publication of Dougherty et al. describe equations for use in determining average tractor ground speed in miles per hour or in feet per minute. In both equations, the average discharge rate is the combined discharge from all drop tubes or hoses and the application width is equal to the width of the tool bar.

A magnetic inductive flowmeter or Doppler flowmeter, coupled with a ground speed indicator, is the most accurate method of determining application rate. A variety of alternate methods are available for estimating application discharge rates. Dougherty et al. provide tabuluar results showing ground travel speeds in miles per hour and feet per minute for application rates of 4,000, 5,000, and 6,000 gallons per acre (using a 16-foot tool bar).

A drag hose system of the present invention is particularly well suited to patterns in which an elongated figure eight or s-shaped patterns are used to cover a field. Turns are made at the end of the field away from the drag hose to avoid running over the hose. In the middle of the field, the travel path is moved one width to leave a path for the return pass. Using a hard-hose reel with a length of 1,300 feet and a drag hose traveling 660 feet on either side, a drag hose system can cover about 40 acres before changing to a new setup. The system, and particularly hitch, of the present invention provide ample support and structural integrity under demanding turns, which can put significant side pull forces on the equipment and hitch.

For example, by extending a supply line diagonally into the field 600 feet and using a drag hose as the feed line, a tractor can work a 40-acre field by itself by working half the field at a time and then straightening the feed line out to do the other half. This requires a shutoff valve at the implement (controlled either manually or using tractor hydraulics) to stop the flow while turning at each end of the field. The flow should be shut off but the pressure kept on as the feed hose is straightened on the diagonal to start application to the second half of the field. This allows the soft hose to remain stiff in the field, which prevents kinking and twisting. A pressure- or radio-activated dump valve at the pump is required to keep the pump running during shutoff periods. The dump valve directs liquid manure back to storage when the shutoff valve is closed by the tractor operator The advantages of using a drag hose system for liquid manure application are numerous. The various chisel plows, sweeps, and disks that are used to incorporate or inject liquid manure also act to prepare the ground for planting. Applying liquid manure with a drag hose system is cost-effective and flexible. The drag hose system has the ability to place liquid manure accurately along irregular field edges at a variety of application rates. Experienced custom or private applicators can use the drag hose system extremely well. The operator's presence on the tractor assures that the manure application is monitored in the field.

Some of the other important advantages of a drag hose system are reduced compaction, reduced odor potential, and higher capacity. Using the drag hose to deliver liquid manure within the field eliminates the need to carry the weight of the manure across the field. In a drag hose system, applying liquid manure to soils that are too wet is automatically discouraged because the tillage operation cannot be performed until the soil is adequately dry. Similarly, since most of the liquid manure is not exposed to the air, odor transfer is limited. The aerated condition of a soil with manure properly incorporated encourages aerobic breakdown of the manure, with less odor produced.

Along with reduced compaction and reduced odor potential, speed is one of the main advantages of a drag hose system. Slightly more manure per hour per setup can be applied by drag hose than by irrigation using a similar-sized pump because the pump will deliver more liquid under a lower pressure requirement. On many farming operations where the window of opportunity for application is small, the drag hose can be used to get the job done quickly, especially when compared to tanker application. The hitch and system described herein permit such speed to be accomplished, with significantly less fear of slow down or damaged equipment due to the increased side load pulls encountered in the course of operation.

What is claimed is:

1. A liquid manure application system comprising a drag hose assembly for the application of liquid manure and a three-point hitch adapted to retain the drag hose assembly on a tractor in the course of operation, wherein the drag hose assembly is permanently and directly attached to the three point hitch in a manner that permits the interchangeable, three point attachment of different tillage tools to the hitch itself.

2. A system according to claim 1 wherein, with regard to lateral pull and structure integrity, the hitch is able to withstand the lateral pull encountered in the course of drag hose operations, in a manner that substantially maintains the structural integrity of the hitch.

3. A system according to claim 1 wherein the hitch is capable of withstanding on the order of 1,000 pounds or more side pull force without undue deformation or failure and in a manner that substantially retains the structural integrity of the hitch.

4. A system according to claim 3 wherein the hitch is capable of withstanding on the order of 2,000 pounds or more side pull force without undue deformation or failure and in a manner that substantially retains the structural integrity of the hitch.

5. A system according to claim 4 wherein the hitch is capable of withstanding on the order of 3000 pounds or more side pull force.

6. A system according to claim 1 wherein the drag hose assembly comprises one or more components of a drag hose system selected from the group consisting of a swivel, manifold, agitator, swing tube, shut off valve, and drag hose.

7. A system according to claim 6 wherein the drag hose assembly comprises a swivel and is attached to the hitch at its swivel.

8. A system according to claim 1 wherein the drag hose assembly includes a hose having a diameter selected from the group consisting of 4", 4½", 5" and 6" diameter, and lengths of up to 1,320 feet.

9. A system according to claim 8 wherein the drag hose assembly can create a load of up to 12,000 pounds.

10. A system according to claim 1 wherein the hitch provides a lower socket inside span of between about 20 and about 50 inches.

11. A system according to claim 10 wherein the inside span is between about 30 and about 35 inches.

12. A system according to claim 1 wherein the hitch is provided in the form of a modified conventional hitch having strengthened vertical side beams and central pin region to permit greater side pull strength.

13. A system according to claim 12 wherein the hitch is fabricated from high strength steel.

14. A system according to claim 13 wherein the hitch includes a pair of spring-loaded locking levers in order to permit the hitch and tillage tools to mounted and unmounted.

15. A system according to claim 14 wherein the hitch is capable of withstanding on the order of 2,000 pounds or more side pull force without undue deformation or failure and in a manner that substantially retains the structural integrity of the hitch.

16. A combination comprising a system according to claim 1 attached to a tractor.

17. A combination according to claim 16 wherein the drag hose assembly comprises one or more components of a drag hose system selected from the group consisting of a swivel, manifold, agitator, swing tube, shut off valve, and drag hose.

18. A combination according to claim 16 wherein the drag hose assembly comprises a swivel and is attached to the hitch at its swivel.

19. A combination according to claim 16 wherein the drag hose assembly includes a hose having a diameter selected from the group consisting of 4", 4½", 5" and 6" diameter, and a length of up to 1,320 feet.

20. A combination according to claim 16 wherein the drag hose assembly can create a load of up to 12,000 pounds.

21. A combination according to claim 16 wherein the hitch provides a lower socket inside span of between about 20 and about 50 inches.

22. A combination according to claim 21 wherein the inside span is between about 30 and about 35 inches.

23. A combination according to claim 16 wherein the hitch is provided in the form of a modified conventional hitch having strengthened vertical side beams and central pin region to permit greater side pull strength.

24. A combination according to claim 23 wherein the hitch is fabricated from high strength steel.

25. A combination according to claim 24 wherein the hitch includes a pair of spring-loaded locking levers in order to permit the hitch and tillage tools to mounted and unmounted.

26. A method of attaching a drag hose assembly to a tractor, the method comprising the steps of providing a system as described in claim 1 and attaching the system to a tractor.

27. A method according to claim 26 wherein the hitch is capable of withstanding on the order of 1000 pounds or more side pull force without undue deformation or failure and in a manner that substantially retains the structural integrity of the hitch.

28. A method according to claim 27 wherein the hitch is capable of withstanding on the order of 2000 pounds or more side pull force.

29. A method according to claim 28 wherein the hitch is capable of withstanding on the order of 3000 pounds or more side pull force.

30. A method according to claim 26 wherein the hitch provides a lower socket inside span of between about 20 and about 50 inches.

31. A method according to claim 30 wherein the inside span is between about 30 and about 35 inches.

32. A method according to claim 26 wherein the hitch is provided in the form of a modified conventional hitch having strengthened vertical side beams and central pin region to permit greater side pull strength.

33. A method according to claim 32 wherein the hitch is fabricated from high strength steel.

34. A method according to claim 33 wherein the hitch includes a pair of spring-loaded locking levers in order to permit the hitch and tillage tools to mounted and unmounted.

35. A method according to 34 wherein the hitch is capable of withstanding on the order of 2000 pounds or more side pull force without undue deformation or failure.

36. A method of delivering manure comprising providing a system according to claim 1 to a tractor, attaching the system to a tractor, and employing the resultant combination of system and tractor to distribute manure.

37. A method according to claim 36 wherein the drag hose assembly comprises one or more components of a drag hose system selected from the group consisting of a swivel, manifold, agitator, swing tube, shut off valve, and drag hose.

38. A method according to claim 37 wherein the drag hose assembly comprises a swivel and is attached to the hitch at its swivel.

39. A method according to claim 36 wherein the drag hose assembly includes a hose having a diameter selected from the group consisting of 4", 4½", 5" and 6" diameter, and a length of up to 1,320 feet.

40. A method according to claim 36 wherein the drag hose assembly can create a load of up to 12,000 pounds.

41. A method according to claim 36 wherein the hitch provides a lower socket inside span of between about 20 and about 50 inches.

42. A method according to claim 41 wherein the inside span is between about 30 and about 35 inches.

43. A method according to claim 36 wherein the hitch is fabricated from high strength steel.

44. A method according to claim 43 wherein the hitch includes a pair of spring-loaded locking levers in order to permit the hitch and tillage tools to mounted and unmounted.

45. A method according to claim 44 wherein the hitch is capable of withstanding on the order of 1000 pounds or more side pull force without undue deformation or failure and in a manner that substantially retains the structural integrity of the hitch.

* * * * *